US012426583B2

(12) United States Patent
Sandstrom

(10) Patent No.: US 12,426,583 B2
(45) Date of Patent: *Sep. 30, 2025

(54) BATTERY POWERED ELECTRIC REEL

(71) Applicant: Pure Fishing, Inc., Spirit Lake, IA (US)

(72) Inventor: Thomas Sandstrom, Oakland Park, FL (US)

(73) Assignee: Pure Fishing, Inc., Spirit Lake, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/512,179

(22) Filed: Nov. 17, 2023

(65) Prior Publication Data

US 2024/0081306 A1 Mar. 14, 2024

Related U.S. Application Data

(63) Continuation of application No. 17/811,237, filed on Jul. 7, 2022, now Pat. No. 11,856,931.

(60) Provisional application No. 63/219,043, filed on Jul. 7, 2021.

(51) Int. Cl.
*A01K 89/01* (2006.01)
*A01K 89/017* (2006.01)

(52) U.S. Cl.
CPC ................... *A01K 89/017* (2013.01)

(58) Field of Classification Search
CPC .............. A01K 89/017; A01K 89/0173; A01K 89/0184; A01K 89/0186
See application file for complete search history.

(56) References Cited

U.S. PATENT DOCUMENTS

| 902,447 | A | 10/1908 | Paul |
| 1,005,015 | A | 10/1911 | French |
| 2,190,398 | A | 2/1940 | Bugatti |
| 2,714,271 | A | 8/1955 | Stratton |
| 2,760,736 | A | 8/1956 | Mahalko et al. |
| 3,437,282 | A | 4/1969 | Honkonen et al. |
| 3,561,695 | A | 2/1971 | Wood, Jr. |
| 3,922,808 | A | 12/1975 | Rieth et al. |
| 4,021,003 | A | 5/1977 | Watkins |
| 4,283,025 | A * | 8/1981 | Whisenhunt ........... G05G 1/085 242/283 |
| 4,378,652 | A | 4/1983 | Lindgren |
| 4,517,760 | A | 5/1985 | Randle |

(Continued)

FOREIGN PATENT DOCUMENTS

| CN | 208258815 U | * 12/2018 |
| JP | 3160954 U | 7/2010 |
| JP | 2021045069 A | * 3/2021 |

*Primary Examiner* — Emmanuel M Marcelo
(74) *Attorney, Agent, or Firm* — Husch Blackwell LLP

(57) ABSTRACT

A motor driven fishing reel is provided. The motor driven fishing reel can include a detachable battery pack configured to supply power to a motorized drive assembly within the motor driven fishing reel. The battery pack can include a power output adaptor that can be engaged with a power input adaptor on the motor driven fishing reel. Alternatively, the power input adaptor can accept power from an external source. The battery pack can include one or more protrusions to engage with one or more receiving channels on the motor driven fishing reel such that the battery pack can easily be attached and detached from the motor driven fishing reel.

15 Claims, 12 Drawing Sheets

(56) References Cited

U.S. PATENT DOCUMENTS

| | | | |
|---|---|---|---|
| 4,598,878 | A | 7/1986 | Steffan |
| 4,634,072 | A | 1/1987 | Stealy |
| 4,739,944 | A | 4/1988 | Atwell |
| 5,004,181 | A | 4/1991 | Fowles |
| 5,088,657 | A | 2/1992 | Chen |
| 5,236,147 | A | 8/1993 | Kaneko |
| 6,012,665 | A | 1/2000 | Olona |
| 6,056,219 | A | 5/2000 | Barkley |
| 7,073,740 | B2 | 7/2006 | Westhoff |
| 7,175,120 | B2 | 2/2007 | Ono |
| 7,269,922 | B1 | 9/2007 | Mack |
| 7,334,749 | B2 | 2/2008 | Terauchi et al. |
| 7,398,939 | B2 | 7/2008 | Terauchi et al. |
| 7,793,877 | B2 | 9/2010 | Ogino et al. |
| 8,770,504 | B1 | 7/2014 | Sandstrom |
| 8,832,990 | B2 | 9/2014 | Morris |
| 8,844,854 | B2 | 9/2014 | Jyo et al. |
| 9,060,500 | B2 | 6/2015 | Lauzon |
| 9,615,556 | B2 | 4/2017 | Kawamata |
| 9,661,835 | B1 | 5/2017 | Sandstrom |
| 10,779,523 | B2 | 9/2020 | Defreitas |
| 10,869,468 | B1 | 12/2020 | Sandstrom |
| 11,219,198 | B2 | 1/2022 | Ji |
| 11,259,512 | B2 | 3/2022 | Lee |
| 2007/0220798 | A1* | 9/2007 | Davidson ............... A01K 91/20 43/43.12 |
| 2008/0196292 | A1* | 8/2008 | Bruell .................. A01K 91/065 43/19.2 |
| 2008/0282597 | A1 | 11/2008 | Gascoingne |
| 2009/0277070 | A1 | 11/2009 | Lindgren |
| 2015/0033611 | A1 | 2/2015 | Hamilton, II |
| 2020/0236917 | A1 | 7/2020 | Washington et al. |
| 2022/0007626 | A1 | 1/2022 | Wenzhi et al. |

\* cited by examiner

BATTERY POWERED ELECTRIC REEL

CROSS-REFERENCE TO RELATED APPLICATION

This application is a continuation application of U.S. application Ser. No. 17/811,237, filed Jul. 7, 2022, which claims the benefit of priority from U.S. Provisional Application No. 63/219,043 filed Jul. 7, 2021, entitled "Battery Powered Electric Reel," the disclosures of which are incorporated herein by reference.

FIELD OF THE INVENTION

The present invention relates to fishing reels, and particularly to motorized electrically power driven fishing reels used in sport fishing.

BACKGROUND OF THE INVENTION

Fishing is a popular sport, hobby, and commercial venture around the world. Modern fishing typically involves the use of a rod, reel and tackle. As is well known, a fishing reel is typically connected to the fishing pole, and includes a spool to allow for fishing line to be drawn out and reeled in. There are a wide variety of fishing reels including, bait-casting reels, spinning reels, spin casting reels, and saltwater conventional and casting reels.

Sport fishing for game fish, such as sword fish, often involves "deep drop" techniques that use heavy test (65.0 0 80.0 lb. test) and/or braided fishing line dispensed to significantly deep depths, typically depths of 1800 feet or more. In such situations, the length of line dispensed from the reel renders manual retrieval a time consuming and laborious process.

As a result, the prior art reveals advancements in fishing reel design directed to providing fishing reels adapted with power assisted winding. For example, U.S. Pat. No. 902,447, issued to Piper in 1908, disclose a fishing pole having an electrically operated winding reel. Various other early power assisted fishing reels are disclosed in the following references: U.S. Pat. No. 1,005,015, issued to French (1911); U.S. Pat. No. 2,190,398, issued to Bugatti (1937); U.S. Pat. No. 2,714,271, issued to Stratton (1955); and U.S. Pat. No. 2,760,736, issued to Mihalko (1956). U.S. Pat. No. 3,922,808, issued to Rieth et al. (1975), discloses a trolling reel capable of automatically positioning the end a line at a desired distance or depth. Further, U.S. Pat. No. 4,021,003, issued to Watkins (1977) and others disclose powered reels that retain the ability to manually reel in the line. U.S. Pat. No. 5,236,147, issued to Kaneko (1993), discloses a fishing reel with a computer line length and display that determines the unwound length of fishing line based on the number of spool revolutions. Further, U.S. Pat. No. 7,175,120, to Ono (2007), and U.S. Pat. Nos. 7,334,749 and 7,398,939, issued to Terauchi et al. (2008) disclose electric fishing reels patented by Diawa Seiko, Inc.

While the above-referenced disclosures reveal limited advancements in the art of motor driven fishing reels there exists a need for further advancements in the art. More particularly, a number of the prior art disclosures rely on conventional brushed DC electric motors to provide the driving force for the reel. Brushed DC electric motors have metallic brushes that are highly susceptible to corrosion related failure, particularly when used in harsh salt water environments. An additional limitation common in the prior art systems is the limitation of having but a single, relatively slow speed. Yet another limitation present in the art relates to the lack of remote control actuation. Accordingly, there exists a need for advancements in the art of motor driven fishing reels.

BRIEF SUMMARY OF THE INVENTION

The present invention overcomes the disadvantages present in the art by providing a motor driven fishing reel powered by a variable speed brushless electric DC motor and adapted for remote control operation. In accordance with a preferred embodiment, a salt water bait-casting reel is adapted with a motorized drive assembly including an end plate having an environmentally sealed cover removably connected thereto, and mounted on the opposite side of the reel from the manual crank. Housed within the cover is a motorized drive assembly including a brushless DC motor having an output shaft connected to a gear system configured to power rotation of the fishing reel spool axle for driving the spool. A power cable provides 12.0 volt DC power from a suitable on-board vessel power source. An electronic motor control system allows for variation of DC motor speed via a manually actuated speed control knob. A remote control device is adapted for wireless communication with the electronic motor control system to allow for remote activation of the DC motor in low and high speed modes. The fishing reel may further be adapted to include a level winding system to ensure that the line is evenly wound on the spool. The level wind system may incorporate a digital display for displaying the length of line that has been cast. Further, the digital display may also be used to display other information such as speed of rotation or battery power level.

Accordingly, it is an object of the present invention to provide an improved motor driven fishing reel.

Another object of the present invention is to provide a motor driven fishing reel having improved corrosion resistance.

Yet another object of the present invention is to provide a motor driven fishing reel capable of operating at variable speeds.

Still another object of the present invention is to provide a motor driven fishing reel adapted with wireless communications to allow for remote operation thereof.

In accordance with these and other objects, which will become apparent hereinafter, the instant invention will now be described with particular reference to the accompanying drawings.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

Figure 1:
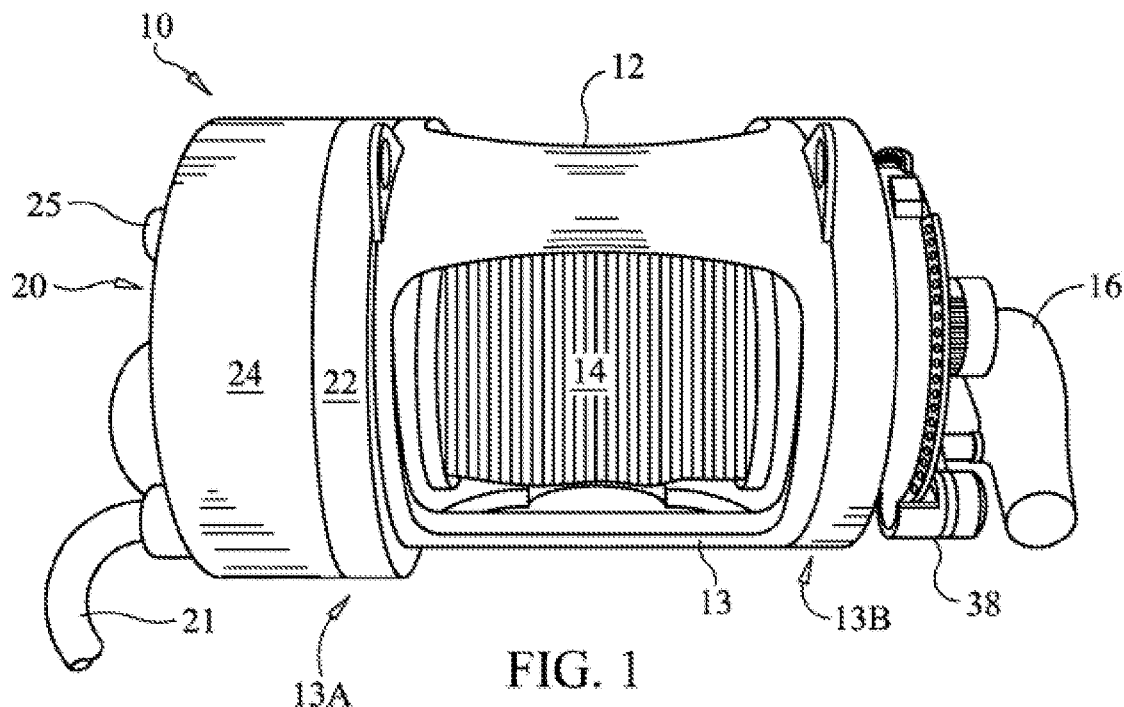
FIG. 1 is a rear perspective view of a motor driven fishing reel in accordance with the present invention.
Figure 2:
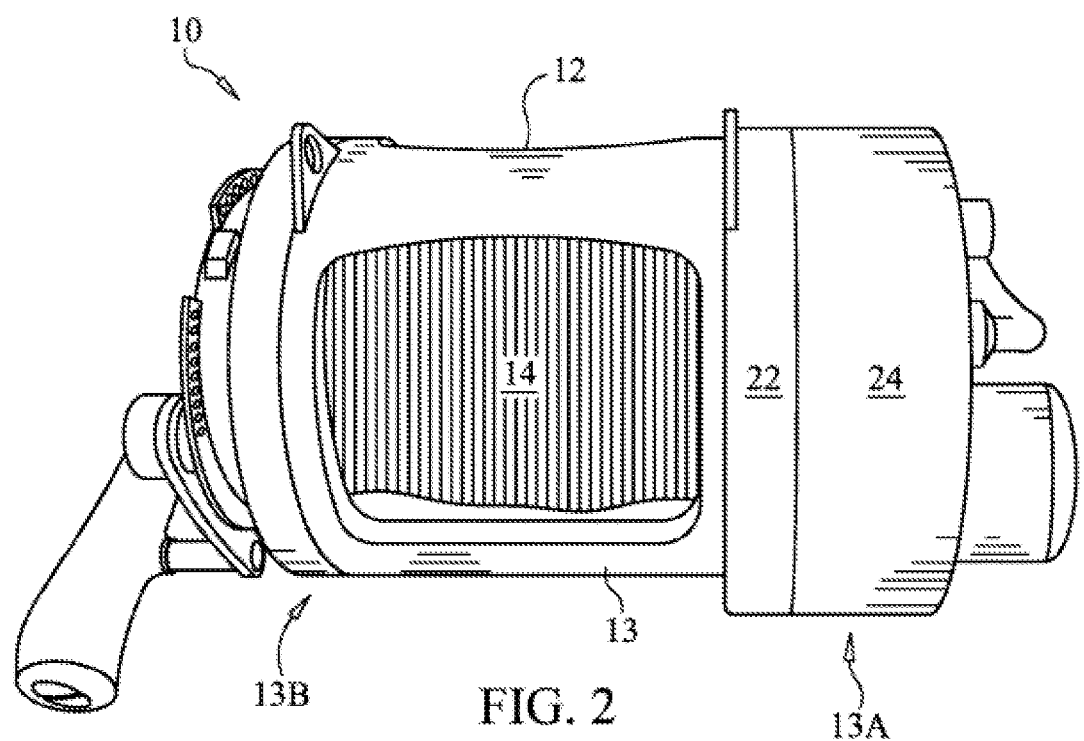
FIG. 2 is a front perspective view thereof.
Figure 3:
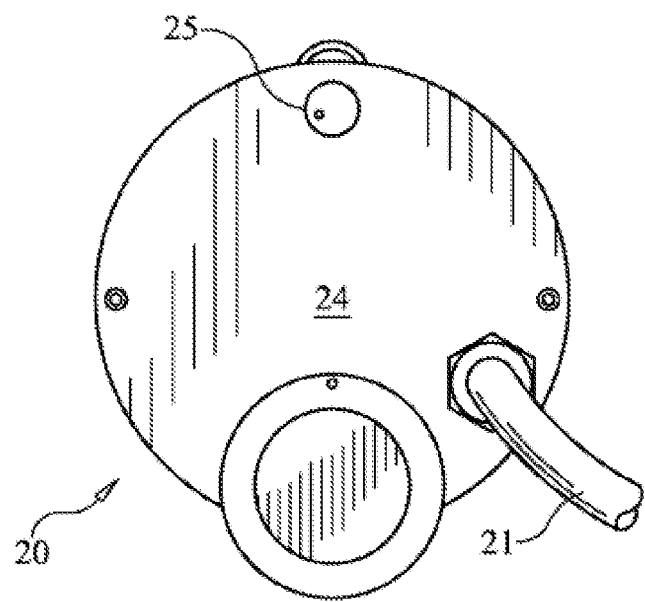
FIG. 3 is a left hand side view thereof.
Figure 4:
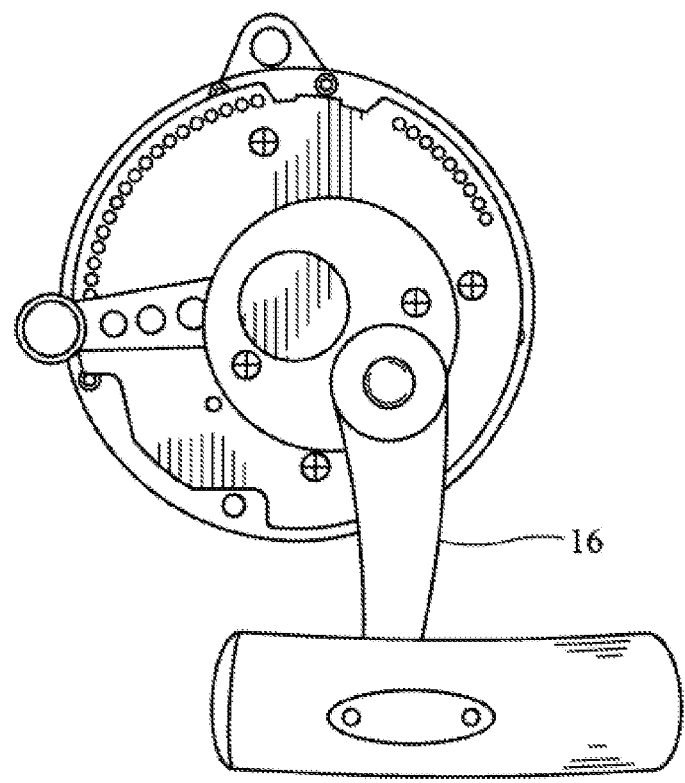
FIG. 4 is a right hand side view thereof.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

While this invention is susceptible of embodiments in many different forms, there are shown in the drawings and will be described in detail herein specific embodiments with the understanding that the present disclosure is an exemplification of the principles of the invention. It is not intended to limit the invention to the specific illustrated embodiments. The features of the invention disclosed herein in the description, drawings, and claims may be significant, both individually and in any desired combinations, for the operation of the invention in its various embodiments. Features from one embodiment may be used in other embodiments of the invention.

With reference now to the drawings, FIGS. 1-20 depict a preferred embodiment and alternate embodiment of a variable speed motor-driven fishing reel, generally referenced as 10, in accordance with the present invention. Turning first to FIGS. 1-14, a motor driven fishing reel 10 includes an otherwise conventional salt water bait-casting reel 12 having a main body 13 having opposing first and second (e.g. right-hand and left-hand) sides, referenced as 13A and 13B. A line spool 14 is rotatably mounted to main body 13 via a spool axle 14A, and configured for manual actuation by a hand crank 16 disposed on the second side 13B of main body 13. Main body 13 is adapted with a motorized drive assembly, generally referenced as 20 attached to the first side 13A of main body 13, namely the side opposite of the crank 16. While the preferred embodiment discloses crank 16 disposed on the first (right-hand) side 13A and motorized drive assembly 20 disposed on the second (left-hand) side 13B, as is customary for right handed users, it should be apparent the crank 16 and motorized drive assembly may be oppositely mounted for left-handed users.

Figure 5:
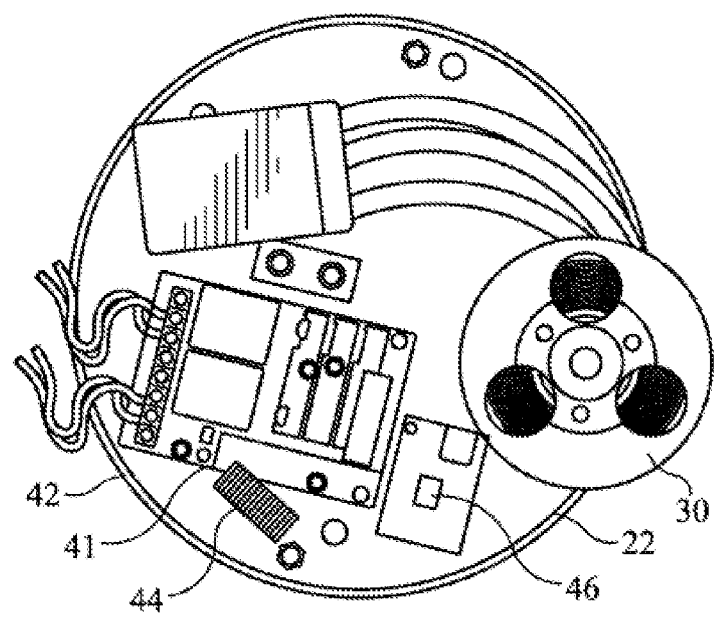
FIG. 5 depicts the electric motor and motor controls for a motor driven fishing reel in accordance with the present invention.
Figure 6:
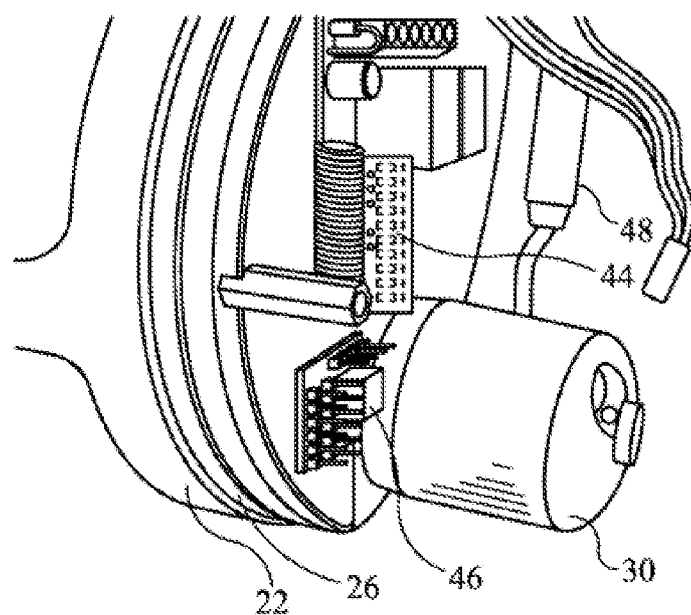
FIG. 6 is a perspective view thereof.

A significant aspect of the present invention involves adapting the bait casting reel 12 with a motorized drive assembly, generally referenced as 20, housing an electric motor and associated controls as more fully discussed herein. As best seen in FIGS. 5 and 6, motorized drive assembly 20 includes an end plate 22 sized and adapted for mating attachment to the left-hand side 13A of main body 13, opposite of the right-hand side 13B and manual hand crank 16. As should be apparent, however, crank 16 and motorized drive assembly 20 may be alternately mounted on either side of main body 13. A cover 24 is removably connected to end plate 22 and an environmental seal is provided by an O-ring gasket 26 disposed circumferentially on end plate 22.

Figure 7:
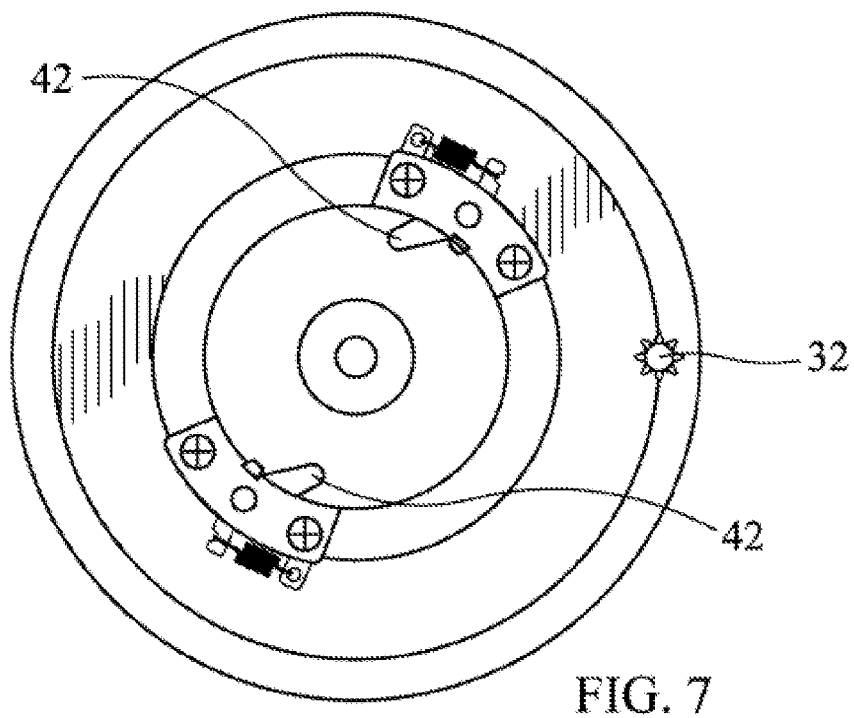
FIG. 7 depicts an interior view at the left hand end of the reel.
Figure 8:
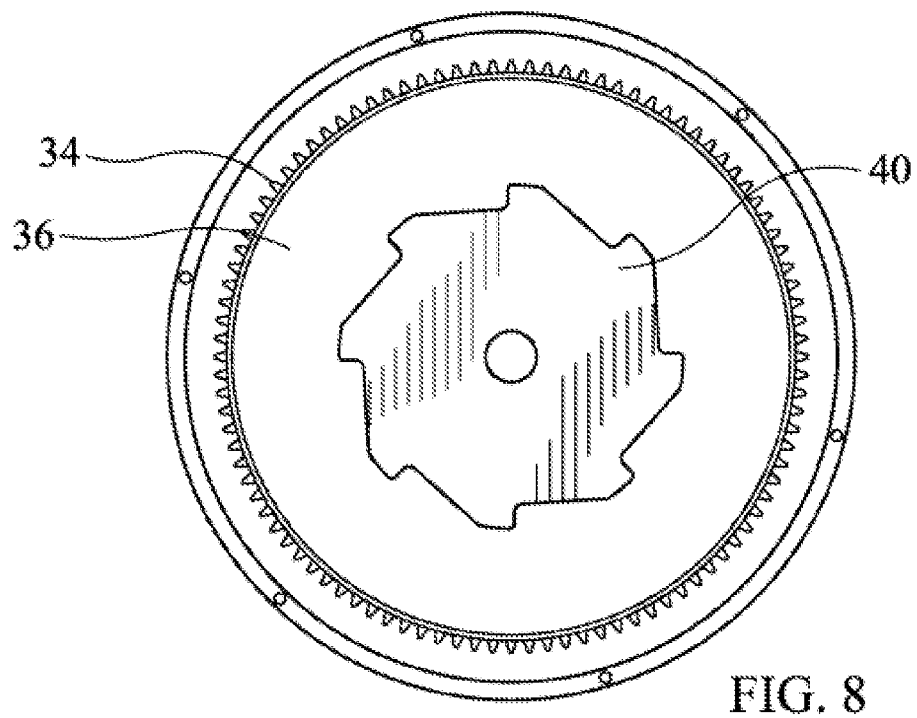
FIG. 8 depicts the spool axle drive gear and anti-reverse gear.
Figure 9:
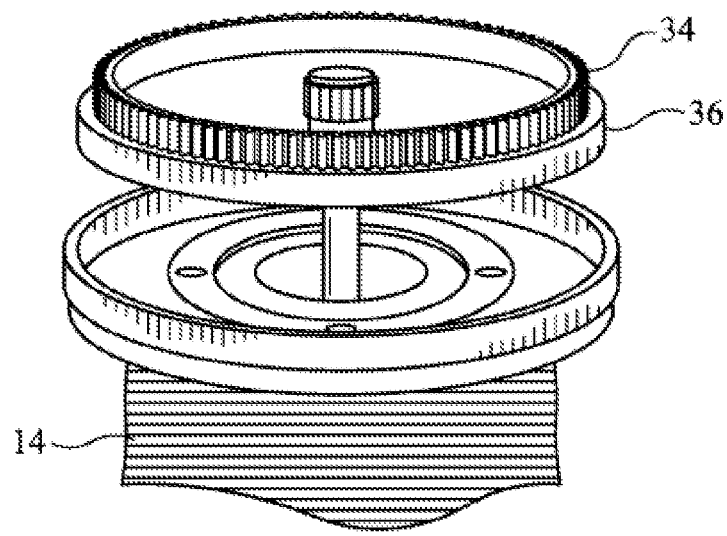
FIG. 9 illustrated removal of the spool drive gear.
Figure 10:
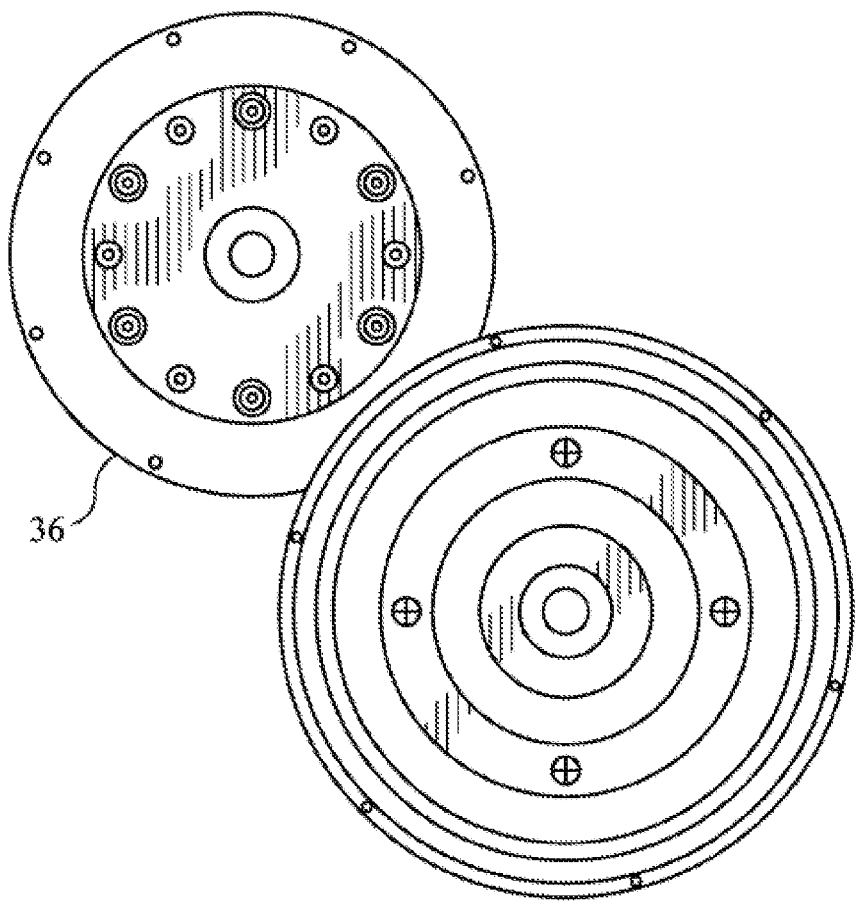
FIG. 10 depicts the clutch connected to the spool drive gear in exploded relation with the spool.

Motorized drive assembly 20 includes an electric motor, generally referenced as 30, mounted to endplate 22. In a preferred embodiment, motor 30 comprises a brushless DC motor, that operates on 12.0 volt direct current (12.0 VDC) and consumes approximately 1,400 Watts of electrical power. DC power from a suitable on-vessel power source is provided to motorized drive assembly via power cable 21. A significant aspect of the present invention involves the use of a brushless out-runner motor thereby avoiding the use of brushes that have led to corrosion related premature failure in prior art devices. Motor 30 has an output shaft connected to a system of intermeshing gears including a first gear 32, a second gear 34. Gear 34 is attached to a clutch 36 that transfers power to line spool 14. Clutch 36 is an integral part of the drag system on the off-the-shelf manually actuated reel. In accordance with the present invention, the clutch is modified by adding gear 34 to clutch 36 thereby converting the clutch assembly into a system capable of transferring power to the reel. A clutch actuation lever 38 is coupled to a cam mechanism (not shown) to allow the user to adjust the contact pressure between clutch 36 and spool 14 thereby providing adjustable drag settings. As illustrated in FIGS. 7 and 8, an anti-reverse mechanism includes a toothed wheel 40 attached to clutch 36, and pivotally connected pawls 42 that ride along the edge of toothed wheel 40 to prevent reverse rotation of spool 14 when engaged. The preferred embodiment of the present invention has demonstrated significant performance advances over the prior art. More particularly, the motor driven fishing reel in accordance with the present invention is capable of reeling in fishing line at a rate of approximately 500 feet-per-minute.

Motorized drive assembly 20 further includes electronics and controls that allow for speed control and wireless remote actuation. More particularly, motorized drive assembly includes a manually actuated speed control knob 25 projects from cover 24. Speed control knob 25 is connected to a potentiometer to allow for adjustment of the input voltage to motor 30 between minimum and maximum settings to allow the user to selectively adjust motor speed, and hence reel winding speed. As seen in FIGS. 5 and 6, motorized drive assembly further includes a circuit board 41 containing a radio frequency (RF) receiver 44 and a pair of RF activated solenoids 42, a microprocessor 46, and a motor speed controller 48.

Figure 14:
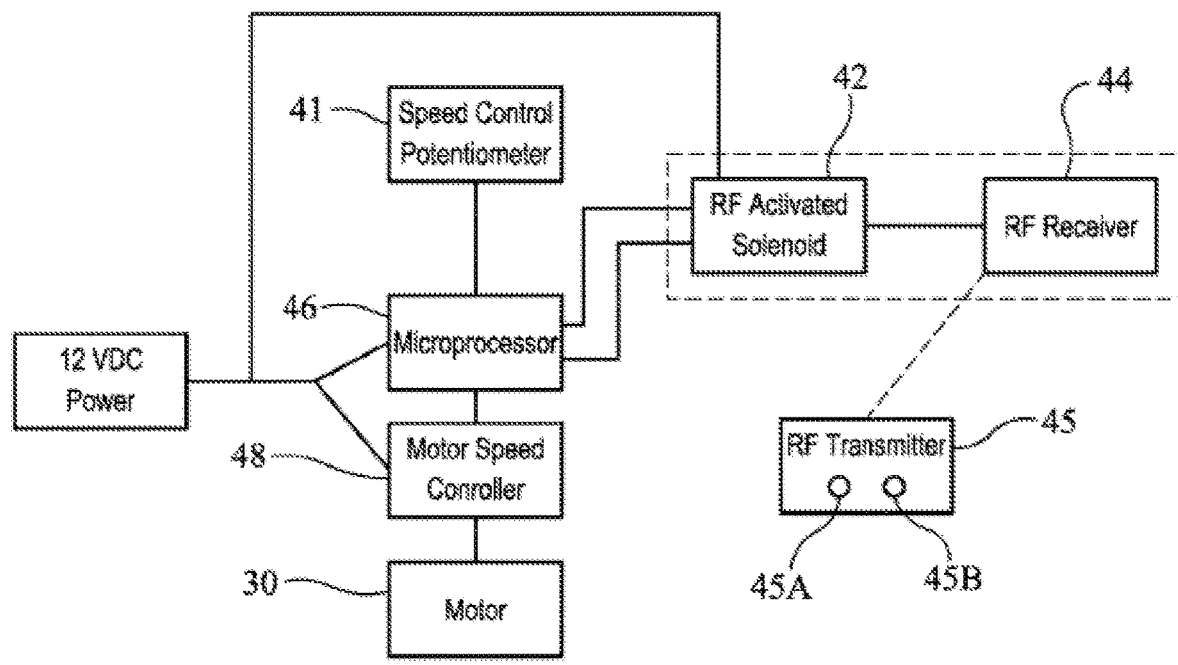
FIG. 14 is an electrical schematic block diagram illustrating electro-mechanical control architecture for a motor-driven fishing reel in accordance with the present invention.

FIG. 14 is an electrical control block diagram for the electrical control system for the motor driven fishing reel in accordance with the present invention. The electrical control system includes a speed control potentiometer 41 functions to allow for speed variation via direct user input by manual actuation of speed control knob 25 (not shown in FIG. 14).

Speed control potentiometer 41 functions to provide a speed control signal to microprocessor 46, which is in electrical communication with a motor speed controller 48. Microprocessor 46 receives the speed control signal and generates an output signal to motor speed controller 48 which uses that signal to controls the input voltage to motor 30. Using this control architecture, rotation of the control knob (25) on speed control potentiometer 41 functions to vary motor/reel winding speed between a minimum value (i.e. full stop) and a maximum value (i.e. full speed).

A further significant aspect of the present invention involves providing a motor driven fishing reel 10, adapted for wireless remote controlled operation. More particularly, as illustrated in FIG. 14, the control architecture includes a radio frequency activated solenoid 42 responsive to a control signal output from an RF receiver 44, which is adapted to receive wireless transmissions from an RF transmitter 45. RF transmitter 45 is preferably a small, portable, battery-powered FOB-type device having manually actuated buttons 45A and 45B corresponding to low and high speed operation. Accordingly, the user may activate the motorized drive assembly from a remote location using RF transmitter 45 to send a signal to RF receiver 44, which in turn activates solenoid 42. In a preferred embodiment, RF activation of solenoid 42 functions to cause motor 30 to operate at full speed, however, any suitable speed is considered within the scope of the present invention.

Figure 11:
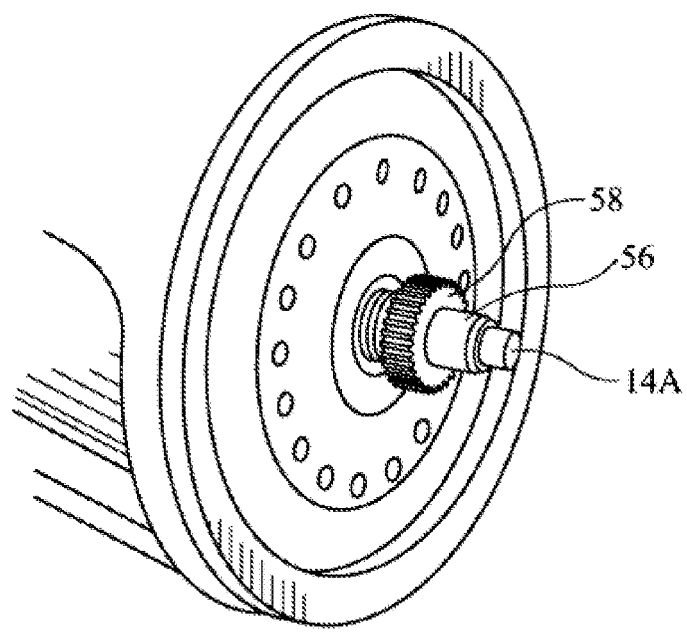
FIG. 11 depicts the right hand end of the spool axle.
Figure 12:
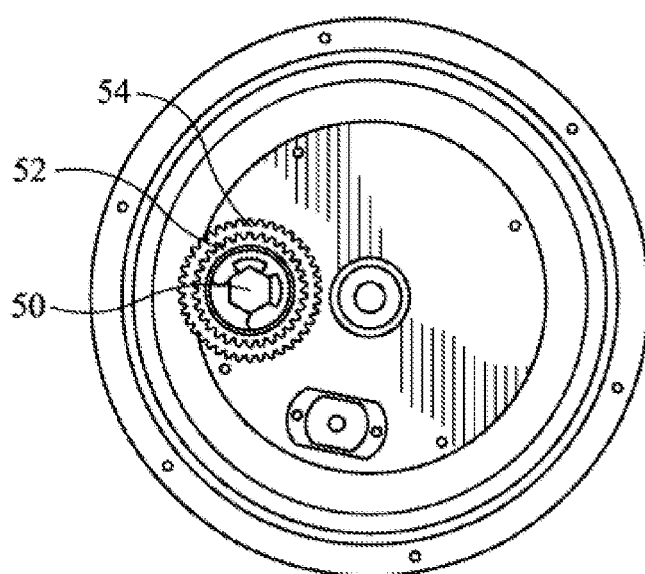
FIG. 12 depicts high and low speed gears connected to the manual winding crank.
Figure 13:
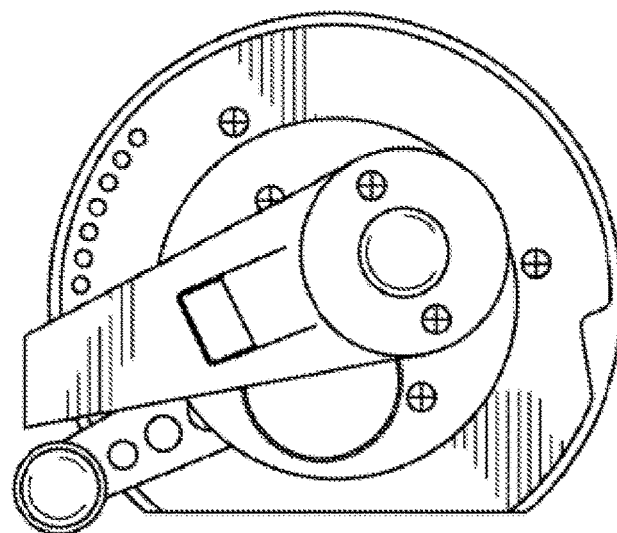
FIG. 13 depicts a detailed right hand side view of the reel.

Finally, the present invention includes means for disengaging reel crank 16 from spool 14 to prevent crank 16 from rotating in unison with the rapidly rotating spool 14 when in a powered winding mode so as to prevent crank 16 from inducing excessive vibration while winding in line. In accordance with this aspect of the present invention, the manual winding mechanism is modified. More particularly, the reel typically includes a system of gears that function to allows for manual low and high speed winding settings as illustrated in FIGS. 11-13. Manual rotation of crank 16 functions to rotate a crank axle 50 having low and high speed gears, referenced as 52 and 54 mounted thereto. A user actuated manual speed selection switch is disposed on the reel and/or crank and functions to allow the user to manually select low and high speeds by selective engagement one of low and high speed gears 52 and 54 with mating gears 56 and 58 mounted to the axle 14A of spool 14. In accordance with the present invention, the teeth of gear 56 are ground off as shown in FIG. 11. This allows the manual crank 16 to free wheel when speed selection switch is configured to the high speed setting. The winding mechanism could alternately be configured with the threads removed from gear 58 within the spirit of the invention.

Figure 15:
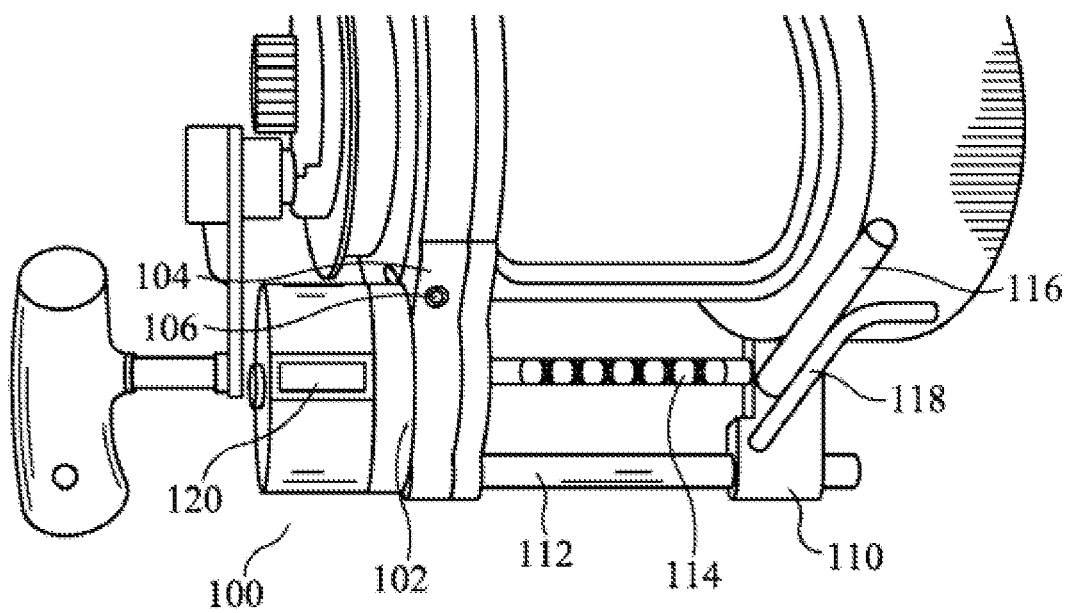
FIG. 15 is a partial front perspective view of a motor driven fishing reel in accordance with the present invention further adapted with an optional level winding accessory.
Figure 16:
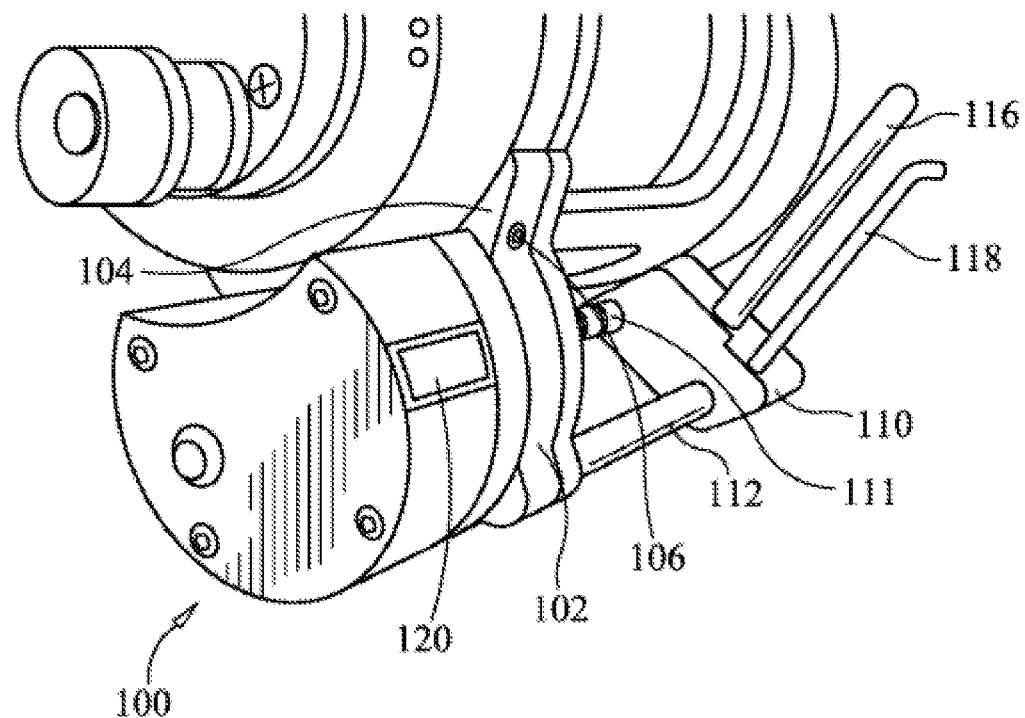
FIG. 16 is a partial right side perspective view thereof.
Figure 17:
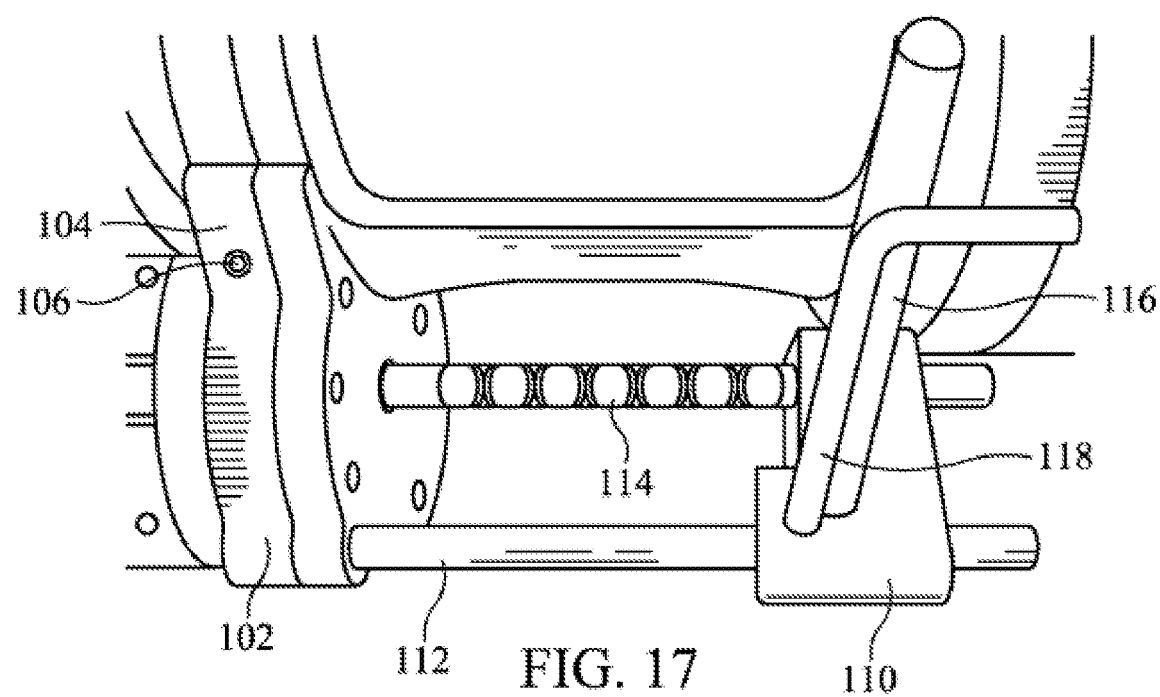
FIG. 17 is a partial top front view thereof.

FIGS. 15-17 depict a motor driven fishing reel 10 adapted with an optional level winding accessory, generally referenced as 100. Level winding accessory 100, is preferably mounted to the right hand side of reel 10 and includes a main body 102 having a mounting flange 104 which receives a fastener 106 to affix accessory 100 to reel 10 as best seen in FIG. 15. Level winding accessory further includes a traversing carriage 110 that traverses back and forth between the opposing left and right hand portions of the spool by riding along a guide rail 112 and a cross-cut reversing lead screw 114. Carriage 110 further includes a pair of projecting line guides, referenced as 116 and 118 that function to guide the winding of the line generally evenly onto the rotating reel spool as carriage 110 traverses back and forth. Level winding accessory 100 further includes a digital display 120 and associated electro-mechanical elements that function to track and display the length of line that has been spooled out. Digital display 120 thus allows the user to precisely determine the length of line cast and/or length of line remaining while winding in.

Figure 18:
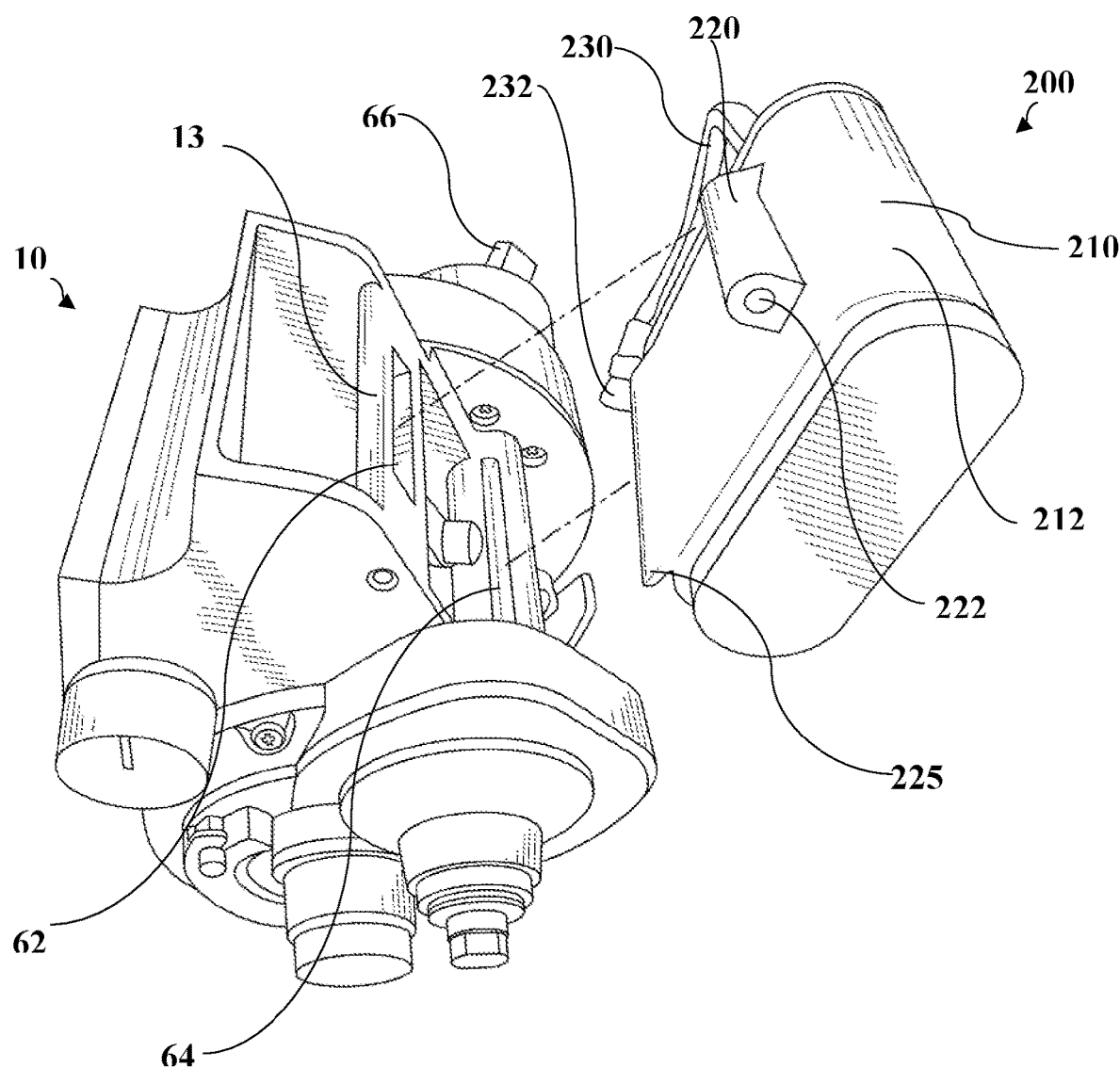
FIG. 18 depicts a perspective view of a motor driven fishing reel according to another embodiment.
Figure 19:
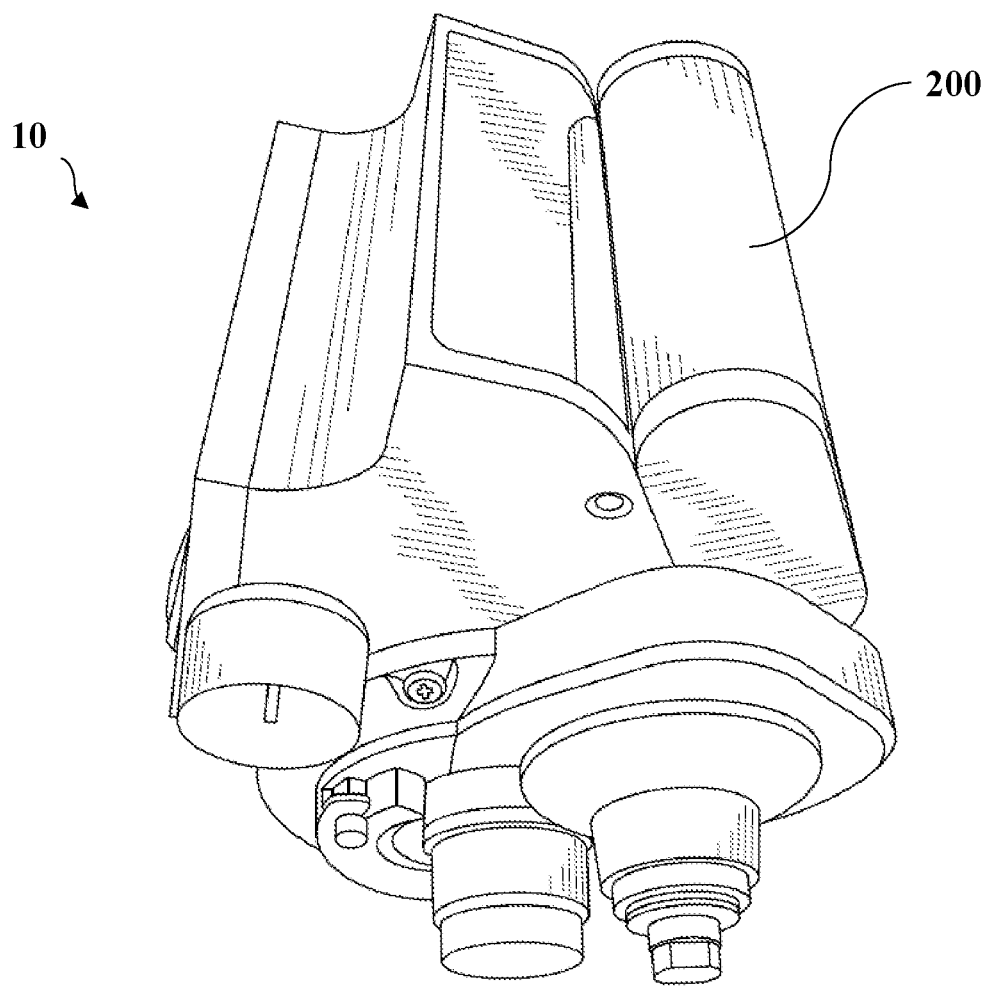
FIG. 19 depicts another perspective view of the motor driven fishing reel of FIG. 18.
Figure 20:
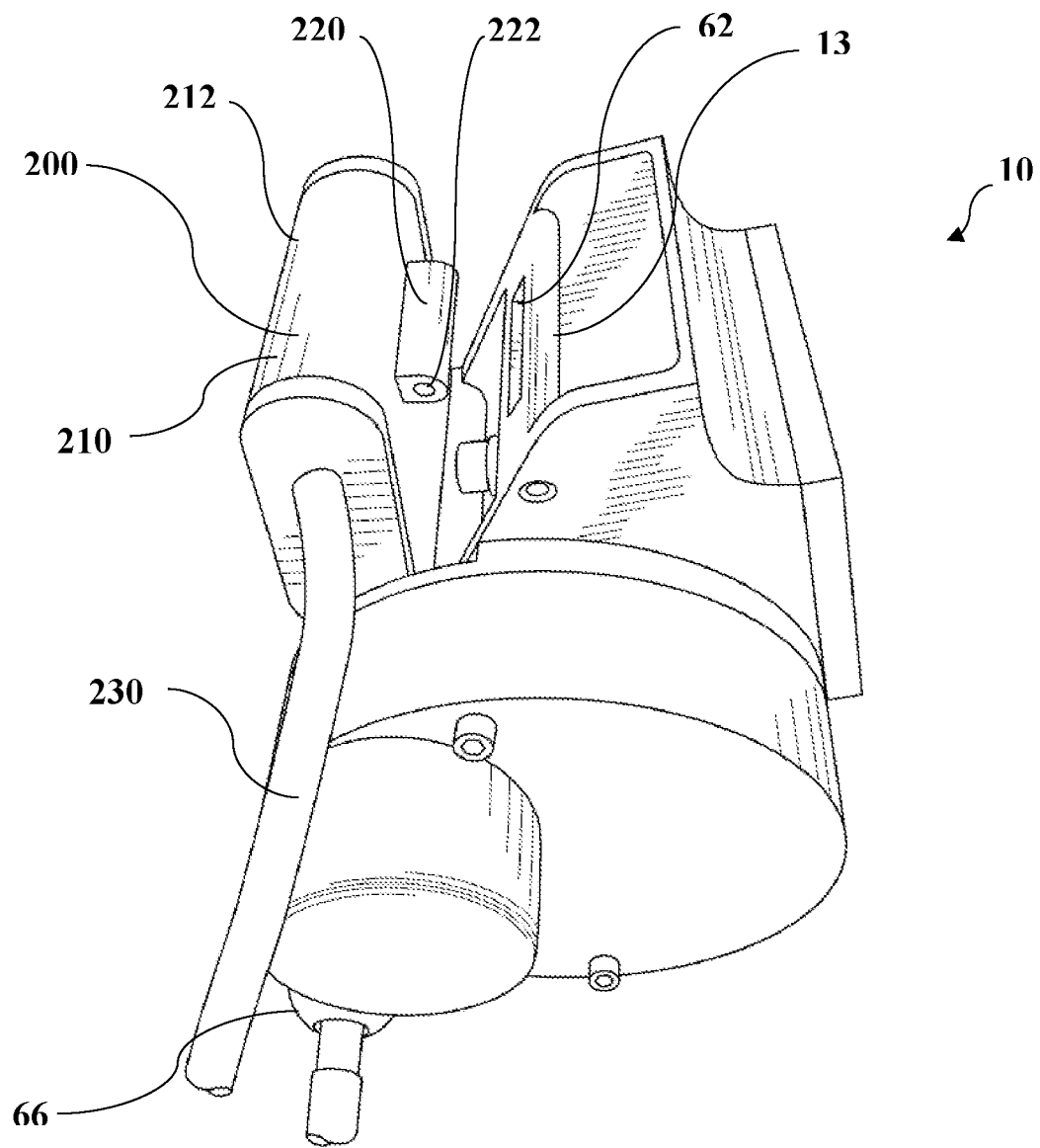
FIG. 20 depicts another perspective view of the motor driven fishing reel of FIG. 18.

FIGS. 18-20 depict an embodiment of a motor driven fishing reel 10 adapted to be battery powered. In this embodiment, a battery pack 200 may be used to provide power to the motorized drive assembly 20. Specifically, the battery pack 200 may be used in conjunction with the power cable 21 as a backup power source. Alternatively, the power cable 21 may be omitted altogether, and the battery pack 200 may be the sole power source for the motorized drive.

In some embodiments, the battery pack 200 may be attachable and detachable to and from the motor driven fishing reel 10. For example, the battery pack 200 may be detached from the motor driven fishing reel 10 in order to charge batteries contained therein, and may be reattached to the motor driven fishing reel 10 when the batteries have been recharged. The detachability of the battery pack 200 also allows for a user to swap in a fully charged battery pack 200 when another battery pack is depleted, thereby permitting the continuous enjoyment of utilizing the motor driven fishing reel 10.

The battery pack may include a housing 210. The housing 210 may include one or more mechanisms (such as protrusions, levers, knobs) on the housing's outer surface 212 that may be mated with the main body 13 of the motor driven fishing reel 10 to thereby attach the battery pack 200 to the motor driven fishing reel 10. Referring to FIGS. 18-20, a first protrusion 220 may be provided on the outer surface 212. The first protrusion 220 may be positioned on a side of the battery pack 200 proximal to the motor driven fishing reel 10. A second protrusion 225 may also be provided on the outer surface 212. In an example embodiment, the second protrusion 225 may be provided on a bottom side of the battery pack 200, such that the first protrusion 220 and the second protrusion 225 protrude in different directions (such as perpendicular).

The main body 13 of the motor driven fishing reel 10 may further include a first receiving channel 62 configured to receive the first protrusion 220 and a second receiving channel 64 configured to receive the second protrusion 225. In operation, the second protrusion 225 may be inserted into the second receiving channel 64, follow by the first protrusion 220 being inserted into the first receiving channel 62 by pivoting the battery pack 200 toward the main body 13, thereby clipping the first protrusion 220 into the first receiving channel 62.

The first protrusion 220 may have rounded edges for the ease of inserting the first protrusion 220 into the first receiving channel 62. The first protrusion 220 may also include one or more holes or bores 222 for a corresponding locking mechanism to lock the battery pack 200 in place once the battery pack 200 is installed onto the main body 13.

The housing 210 may include an internal chamber (now shown) where one or more batteries may be provided therein. The housing 210 may further include circuitries within the internal chamber to interface with the one or more batteries.

Moreover, the battery pack 200 may include a power wire 230 with a power output adaptor 232 coupled thereto to provide power from the one or more batteries to the motor driven fishing reel 10. In some embodiments, in place of the power cable 21, a power input adaptor 66 may be provided on a surface of the main body 13. The power input adaptor 66 may be used to accept the power cable 21 to thereby enables the motor driven fishing reel 10 to accept power from a boat, or the power input adaptor 66 may also be used to accept the power output adaptor 232 from the battery pack 200, thereby enables the motor driven fishing reel 10 to be completely cordless. Further, the power input adaptor 66 may be easily serviceable and replaceable. In an example, the power input adaptor 66 may be a receptacle that is coupled to the main body 13 via one or more screws. In the event that the power input adaptor is damaged or worn down, the power input adaptor 66 may be replaced without having to replace the entire motor driven fishing reel 10. Alternative electrical connections between the battery pack 200 and the motor driven fishing reel 10 are also envisioned.

In some embodiments, the battery pack 200 may include a charging circuitry so that the one or more batteries may be recharged without having to remove said one or more batteries from the housing 210. Likewise, the housing 210 of the battery pack 200 may further include a first electric contact, and the main body 13 of the motor driven fishing reel 10 may include a second electric contact, so that the first and second electric contacts may act as an interface to provide power from the battery to the motor driven fishing reel 10 when the battery pack 200 is attached to the motor driven fishing reel 10.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A motor driven fishing reel comprising:
a main body;
a fishing line spool rotatably mounted to said main body via a spool axle;
a motorized drive assembly affixed to said main body;
said motorized drive assembly including an electric motor having an output shaft configured for powered rotation of said spool;
a battery pack detachable from the main body, the battery pack comprising a housing having an outer surface, a first protrusion protruding on the outer surface in a first direction, and a second protrusion protruding on the outer surface in a second direction different from the first direction; and
the main body comprising a first receiving channel configured to receive the first protrusion and a second receiving channel configured to receive the second protrusion;
wherein the battery pack is attached to the main body by engaging the first protrusion with the first receiving channel and engaging the second protrusion with the second receiving channel; and
an electrical control system to allow for user variation of the speed of said motor thereby allowing for user regulation of spool winding speed, wherein a user adjusts the speed of said motor by manually actuating a speed control knob.

2. The motor driven fishing reel of claim 1, wherein the battery pack supplies power to the motorized drive assembly.

3. The motor driven fishing reel of claim 1 further comprising:
a power output adaptor coupled to the battery pack; and
a power input adaptor coupled to the main body,
wherein the power output adaptor is configured to engage the power input adaptor.

4. The motor driven fishing reel of claim 1, wherein the battery pack further comprises one or more rechargeable batteries.

5. The motor driven fishing reel of claim 1, wherein the first protrusion comprises a bore configured to engage a locking mechanism on the main body.

6. The motor driven fishing reel of claim 1, further comprising a power input adaptor coupled to the main body, wherein the power input adaptor is configured to accept power from an external source to power the motorized drive assembly.

7. The motor driven fishing reel of claim 1, wherein the electrical control system is configured to:
receive a speed control signal indicative of a position of the speed control knob; and
control the speed of said motor in response to the speed control signal.

8. A motor driven fishing reel comprising:
a main body;
a fishing line spool rotatably mounted to said main body via a spool axle;
a motorized drive assembly affixed to said main body;
said motorized drive assembly including an electric motor having an output shaft configured for powered rotation of said spool;
a battery pack detachable from the main body, the battery pack comprising a housing having an outer surface and a first protrusion on the outer surface, the first protrusion comprising a bore; and
the main body comprising a first receiving channel configured to receive the first protrusion, wherein the bore of the first protrusion is configured to engage a locking mechanism on the main body; and
an electrical control system to allow for user variation of the speed of said motor thereby allowing for user regulation of spool winding speed, wherein a user adjusts the speed of said motor by manually actuating a speed control knob.

9. The motor driven fishing reel of claim 8, wherein the first protrusion protrudes on the outer surface of the housing in a first direction, wherein the housing comprises a second protrusion protruding on the outer surface in a second direction different from the first direction, and wherein the main body comprises a second receiving channel configured to receive the second protrusion.

10. The motor driven fishing reel of claim 8, further comprising a power input adaptor coupled to the main body, wherein the power input adaptor is configured to accept power from an external source to power the motorized drive assembly.

11. The motor driven fishing reel of claim 8, wherein the electrical control system is configured to:
receive a speed control signal indicative of a position of the speed control knob; and
control the speed of said motor in response to the speed control signal.

12. A motor driven fishing reel comprising:
a main body;
a fishing line spool rotatably mounted to said main body via a spool axle;
a motorized drive assembly affixed to said main body;
said motorized drive assembly including an electric motor having an output shaft configured for powered rotation of said spool;
a battery pack detachable from the main body, the battery pack comprising a housing having an outer surface and a first protrusion on the outer surface; and the main body comprising a first receiving channel configured to receive the first protrusion;

an electrical control system to allow for user variation of the speed of said motor thereby allowing for user regulation of spool winding speed; and a power input adaptor coupled to the main body, wherein the power input adaptor is configured to accept power from an external source to power the motorized drive assembly.

13. The motor driven fishing reel of claim 12, wherein a user adjusts the speed of said motor by manually actuating a speed control knob, wherein the electrical control system is configured to:

receive a speed control signal indicative of a position of the speed control knob; and control the speed of said motor in response to the speed control signal.

14. The motor driven fishing reel of claim 12, wherein the first protrusion protrudes on the outer surface of the housing in a first direction, wherein the housing comprises a second protrusion protruding on the outer surface in a second direction different from the first direction, and wherein the main body comprises a second receiving channel configured to receive the second protrusion.

15. The motor driven fishing reel of claim 12, wherein the first protrusion comprises a bore configured to engage a locking mechanism on the main body.

\* \* \* \* \*